(12) United States Patent
Whitford

(10) Patent No.: US 12,553,200 B2
(45) Date of Patent: Feb. 17, 2026

(54) VEHICLE MITIGATION SYSTEMS AND METHODS OF DEPLOYING A VEHICLE MITIGATION SYSTEM

(71) Applicant: Peter Duncan Whitford, Pasadena, CA (US)

(72) Inventor: Peter Duncan Whitford, Pasadena, CA (US)

( * ) Notice: Subject to any disclaimer, the term of this patent is extended or adjusted under 35 U.S.C. 154(b) by 236 days.

(21) Appl. No.: 18/140,618

(22) Filed: Apr. 28, 2023

(65) Prior Publication Data

US 2023/0257946 A1     Aug. 17, 2023

Related U.S. Application Data

(63) Continuation-in-part of application No. 17/035,704, filed on Sep. 29, 2020, now Pat. No. 12,031,280.

(60) Provisional application No. 63/336,288, filed on Apr. 28, 2022, provisional application No. 62/880,012, filed on Jul. 29, 2019.

(51) Int. Cl.
| | | |
|---|---|---|
| *E01F 13/02* | (2006.01) | |
| *B62B 1/02* | (2006.01) | |
| *B62B 1/26* | (2006.01) | |
| *B62B 5/04* | (2006.01) | |

(52) U.S. Cl.
CPC ............... *E01F 13/02* (2013.01); *B62B 1/02* (2013.01); *B62B 1/26* (2013.01); *B62B 5/0457* (2013.01)

(58) Field of Classification Search
CPC . E01F 13/00; E01F 13/02; E01F 13/04; E01F 13/12; E01F 15/145; E01F 15/148; B62B 5/04; B62B 5/0438; B62B 5/0442; B62B 5/0447; B62B 5/0485
See application file for complete search history.

(56) References Cited

U.S. PATENT DOCUMENTS

| | | | |
|---|---|---|---|
| 1,449,518 | A | 3/1923 | Lawson |
| 1,631,416 | A | 6/1927 | Howard |

(Continued)

FOREIGN PATENT DOCUMENTS

| | | | |
|---|---|---|---|
| CH | 650739 A5 | * | 8/1985 |
| CH | 680722 A5 | * | 10/1992 |

(Continued)

OTHER PUBLICATIONS

MERIDIAN Rapid Defense Group, YouTube video titled "MERIDIAN® Vehicle Barriers at Work Across the Globe" (Nov. 11, 2020), https://www.youtube.com/watch?v=afg2fQr3Wfk. (Year: 2020).*

(Continued)

*Primary Examiner* — Jonathan P Masinick
(74) *Attorney, Agent, or Firm* — Patterson + Sheridan, LLP

(57) ABSTRACT

A vehicle mitigation system a barrier hauler and at least one barrier. The barrier hauler includes a stem, a handle positioned at one end of the stem, and at least one wheel positioned near an opposite end of the stem, the wheel capable of rotating relative to the stem. The barrier hauler further includes a lift arm having an engagement pin, the lift arm rigidly fixed relative to the stem and disposed at a first angle to the stem. The barrier includes at least one wheel positioned at a first end of the barrier to act in cooperation with the at least one wheel of the barrier hauler when the barrier hauler is engaged with the barrier.

20 Claims, 12 Drawing Sheets

(56) References Cited

U.S. PATENT DOCUMENTS

| | | | |
|---|---|---|---|
| 1,715,938 A * | 6/1929 | Miller | B62B 5/04 |
| | | | 188/22 |
| 2,777,227 A | 1/1957 | Frank | |
| 3,065,680 A | 11/1962 | Wiedman, Sr. | |
| 3,135,062 A | 6/1964 | Guerco | |
| 4,480,405 A | 11/1984 | Ferguson | |
| 4,630,395 A | 12/1986 | Nasatka | |
| 4,854,767 A | 8/1989 | Sasaki | |
| 4,968,177 A | 11/1990 | Bechtold | |
| 4,998,843 A | 3/1991 | Mothe | |
| 5,145,278 A | 9/1992 | Lohrmann | |
| 5,228,237 A | 7/1993 | Nasatka | |
| 5,356,119 A | 10/1994 | Schock | |
| 5,549,410 A | 8/1996 | Beryozkin et al. | |
| 5,997,211 A | 12/1999 | Chou | |
| 6,079,904 A | 6/2000 | Trisl | |
| 6,296,234 B1 | 10/2001 | De Boer | |
| 6,679,649 B1 | 1/2004 | Capolupo | |
| 6,702,512 B1 | 3/2004 | Reale | |
| 6,767,158 B1 | 7/2004 | Consolazio et al. | |
| 6,843,614 B2 | 1/2005 | Yodock, Jr. et al. | |
| 6,886,299 B2 | 5/2005 | Gower | |
| 6,907,811 B2 | 6/2005 | White | |
| 6,962,245 B2 | 11/2005 | Ray et al. | |
| 7,083,357 B2 | 8/2006 | Lamore | |
| 7,101,112 B2 | 9/2006 | Burns et al. | |
| 7,140,802 B2 | 11/2006 | Lamore | |
| 7,172,176 B1 | 2/2007 | Eastland | |
| 7,264,417 B1 | 9/2007 | Nasatka | |
| 7,320,557 B1 | 1/2008 | Potter | |
| 7,494,112 B2 | 2/2009 | Fromm | |
| 7,819,604 B2 | 10/2010 | Breed | |
| 7,918,622 B2 | 4/2011 | Whitford | |
| 7,959,373 B1 | 6/2011 | Brown | |
| 8,215,866 B2 | 7/2012 | Whitford | |
| 10,407,852 B2 | 9/2019 | Dickinson et al. | |
| 10,508,393 B1 * | 12/2019 | Page | E01F 13/02 |
| 10,900,182 B2 | 1/2021 | Harris et al. | |
| 10,941,531 B2 | 3/2021 | Dickinson et al. | |
| 2002/0182007 A1 | 12/2002 | Yodock, Jr. et al. | |
| 2003/0159356 A1 | 8/2003 | Russell | |
| 2004/0089143 A1 | 5/2004 | Gilon | |
| 2005/0220536 A1 | 10/2005 | Blair et al. | |
| 2005/0254892 A1 | 11/2005 | Yodock, III et al. | |
| 2006/0078380 A1 | 4/2006 | Dehart | |
| 2006/0233607 A1 | 10/2006 | Buckley et al. | |
| 2007/0272911 A1 | 11/2007 | Fromm | |
| 2008/0157493 A1 | 7/2008 | McConkey et al. | |
| 2008/0223857 A1 | 9/2008 | Palley et al. | |
| 2009/0067923 A1 | 3/2009 | Whitford | |
| 2009/0092443 A1 | 4/2009 | Friedman et al. | |
| 2009/0250674 A1 | 10/2009 | Darcy | |
| 2010/0202829 A1 | 8/2010 | Gelfand et al. | |
| 2011/0271597 A1 | 11/2011 | Wilkinson et al. | |
| 2012/0168702 A1 * | 7/2012 | Fromm | F41H 5/045 |
| | | | 89/929 |
| 2012/0177439 A1 * | 7/2012 | More | E01F 13/12 |
| | | | 404/6 |
| 2016/0053450 A1 | 2/2016 | Neusch | |
| 2016/0160459 A1 | 6/2016 | Orner, Jr. | |
| 2017/0204575 A1 | 7/2017 | Klein | |
| 2017/0356203 A1 | 12/2017 | Nagel | |
| 2019/0226167 A1 | 7/2019 | Gerrard et al. | |
| 2019/0330812 A1 | 10/2019 | Ptacek et al. | |
| 2020/0063387 A1 * | 2/2020 | Klein | E01F 13/022 |
| 2020/0173121 A1 * | 6/2020 | Klein | E01F 13/12 |
| 2022/0259889 A1 | 8/2022 | Jordan | |
| 2022/0298733 A1 * | 9/2022 | Graziadei | E01F 13/12 |

FOREIGN PATENT DOCUMENTS

| | | | | |
|---|---|---|---|---|
| DE | 19516597 A1 * | 11/1996 | | B60T 11/04 |
| DE | 102006014699 A1 * | 7/2007 | | B60B 33/0018 |
| EP | 3792401 B1 | 7/2022 | | |
| FR | 968618 A * | 12/1950 | | |
| GB | 158281 A | 2/1921 | | |
| GB | 2132478 A * | 7/1984 | | B60B 33/0042 |
| GB | 2178094 A | 2/1987 | | |
| WO | 2006/088428 A1 | 8/2006 | | |
| WO | 2007040626 A2 | 4/2007 | | |
| WO | 2020170282 A1 | 8/2020 | | |
| WO | 2023/229788 A2 | 11/2023 | | |

OTHER PUBLICATIONS

MERIDIAN Rapid Defense Group, YouTube video titled "Deployment of Archer® 1200 Barriers with the V3 Hauler" (Mar. 13, 2019), https://www.youtube.com/watch?v=TveFiJVmvko. (Year: 2019).*

MERIDIAN Rapid Defense Group, YouTube video titled "Deployment of MERIDIAN® Barriers with Air Tow Trailer" (Jan. 25, 2019), https://www.youtube.com/watch?v=qXQeYXeYVRc. (Year: 2019).*

Delta Scientific Corporation Portable Barriers:MP5000 posted on DeltaScientific.com original date unknown. Publication date unknown—first cited to the USPTO on Jul. 22, 2008 in U.S. Pat. No. 7,918,622.

General Dynamics Portable Vehicle Arresting Barrier General Dynamics advertisement original date unknown. Publication date unknown—first cited to the USPTO on Jul. 22, 2008 in U.S. Pat. No. 7,918,622.

The Mifram Group Modular Vehicle Barrier posted on MiframSecurity.com original date unknown. Publication date unknown—first cited to the USPTO on Jul. 22, 2008 in U.S. Pat. No. 7,918,622.

The Mojo Barriers Mojo Steel Barrier posted on MojoBarriers.com original date unknown. Publication date unknown—first cited to the USPTO on Jul. 22, 2008 in U.S. Pat. No. 7,918,622.

Delta Scientific Corporation product specification for model DSC2000 Phalanx Barrier posted on Delta Scientific Website dated Oct. 11, 2006.

Carnahan Conference Paper Albuquerque New Mexico Oct. 2004 Presented by Nigel Buckley. Publication date unknown—first cited to the USPTO on Jul. 22, 2008 in U.S. Pat. No. 7,918,622.

International Search Report and Written Opinion dated Jul. 21, 2023, prepared in International Application No. PCT/US2023/020291.

International Search Report and Written Opinion dated Sep. 26, 2023, prepared in International Application No. PCT/US2023/027296.

International Search Report and Written Opinion dated Dec. 19, 2023 and prepared in PCT/US2023/020290.

Meridian Rapid Defense Group, Ventura CA Parade Protection. YouTube. Apr. 19, 2022. [Retrieved on Nov. 13, 2023]. Retrieved from internet: <URL: https://www.youtube.com/watch?v=0TFzLOVteBY>, entire video.

International Search Report and Written Opinion dated Nov. 17, 2023, prepared in International Application No. PCT/US2023/032320.

Meridian Rapid Defense Group, Archer Beam Gate Deployment and Use. YouTube. Sep. 5, 2019. [Retrieved on Oct. 23, 2019]. Retrieved from Internet: ,URL: https://www.youtube.com/watch?v=a5EqkkAh-dY. entire video.

Fromm Barriers, Inc., Instant Protection When the Clock is Ticking, at least as early as Sep. 2006, 2 pages.

Meridian Rapid Defense Group, Better Barriers for the 21st Century—Archer 1000 Anti-Vehicle Barrier System. The Wayback Machine—https://web.archive.org/web/20090804105407/http://www.betterbarriers.com:80/products/archer1000/, at least as early as Aug. 4, 2009.

Meridian Rapid Defense Group, Better Barriers for the 21st Century—Transportation Products, The Wayback Machine—https://webarchive.org/web/20090804105417/http://www.betterbarriers.com:80/products/transportation/, at least as early as Aug. 4, 2009.

Meridian Rapid Defense Group, Better Barriers for the 21st Century—Archer 500, undated but at least as early as Mar. 27, 2014.

Meridian Rapid Defense Group, Better Barriers for the 21st Century—Archer 750, undated but at least as early as Jan. 8, 2016.

Meridian Rapid Defense Group, Better Barriers for the 21st Century—Rapid Gate, Archer Beam Gate, Archer Active Gate, The Wayback Machine—https://web.archive.org/web/20090803215738/http://www.

(56) References Cited

OTHER PUBLICATIONS betterbarriers.com:80/products/rapid_gate/, 2009 Meridian Rapid Defense Group, LLC, at least as early as Aug. 3, 2009.
MERIDIAN Rapid Defense Group, Youtube video titled "MERIDIAN® Vehicle Barriers at Work Across the Globe", published Nov. 11, 2020, https://www.youtube.com/watch?v=afg2fQr3Wfk.
MERIDIAN Rapid Defense Group, YouTube video titled "Deployment of Archer® 1200 Barriers with the V3 Hauler", published Mar. 13, 2019, https://www.youtube.com/watch?v=TveFiJVmvko.
MERIDIAN Rapid Defense Group, YouTube video titled "Deployment of MERIDIAN® Barriers with Air Tow Trailer", published Jan. 25, 2019, https://www.youtube.com/watch?v=qXQeYXeYVRc.
Australian Examination Report for Application No. 2023263404 mailed Sep. 12, 2025.
Australian Examination Report for Application No. 2023275395 mailed Sep. 19, 2025.

\* cited by examiner

VEHICLE MITIGATION SYSTEMS AND METHODS OF DEPLOYING A VEHICLE MITIGATION SYSTEM

CROSS-REFERENCE TO RELATED APPLICATIONS

This application is a continuation-in-part of U.S. patent application Ser. No. 17/035,704, filed on Sep. 29, 2020, which claims the benefit of U.S. Provisional Application No. 62/880,012, filed Jul. 29, 2019; and also claims the benefit of and priority to U.S. Provisional Application No. 63/336,288, filed on Apr. 28, 2022, all of which are hereby incorporated by reference herein.

TECHNICAL FIELD

The present disclosure relates generally to the field of vehicle mitigation systems, and specifically to portable barriers and barrier haulers capable of rapidly deploying the portable barriers to protect against vehicular and military style breaches.

BACKGROUND

Vehicle intrusions into restricted, protected or unwanted areas are troublesome due to the damage that can be caused, both in terms of property damage and injury or loss of life. There are many scenarios in which it is desired to restrict vehicular traffic in an area. Examples include road construction and other construction sites in order to protect construction workers and equipment. Others include high-profile or highly attended events like parades, sporting events, and political gatherings, where it is desired to keep unauthorized vehicles away from certain areas, especially those that have large gatherings of pedestrians. Still others include secure facilities such as military bases, governmental facilities or areas designated as restricted by law enforcement. While it is possible in some instances to install permanent barriers, many events or situations require that protection against vehicular intrusion be quickly provided and then removed following an event or situation calling for such protection.

BRIEF DESCRIPTION OF THE DRAWINGS

Illustrative examples of the present disclosure are described in detail below with reference to the attached drawing figures, which are incorporated by reference herein, and wherein.

Figure 1:
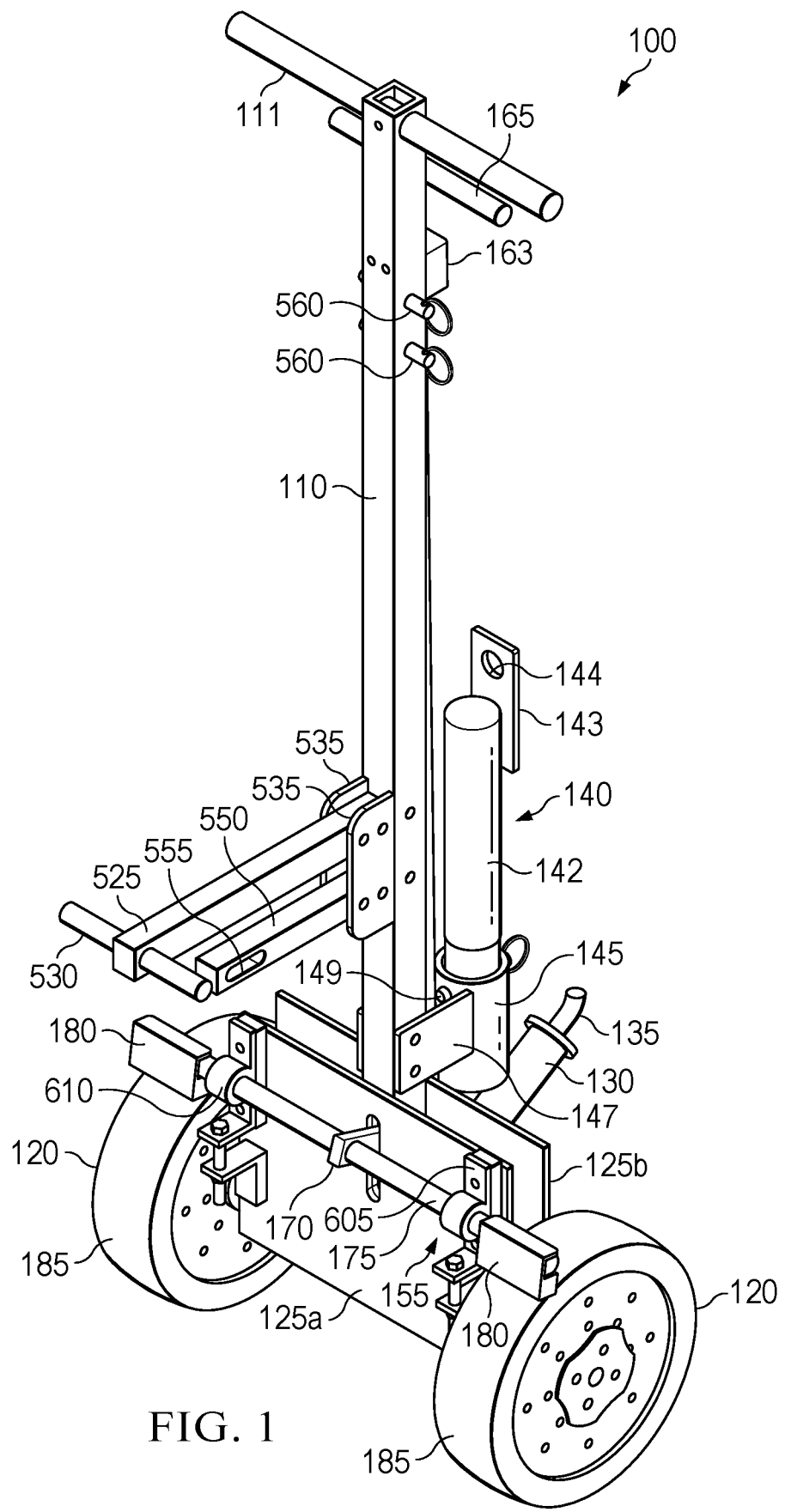
FIG. 1 is a front perspective view of a barrier hauler in accordance with one or more examples described herein.
Figure 2:
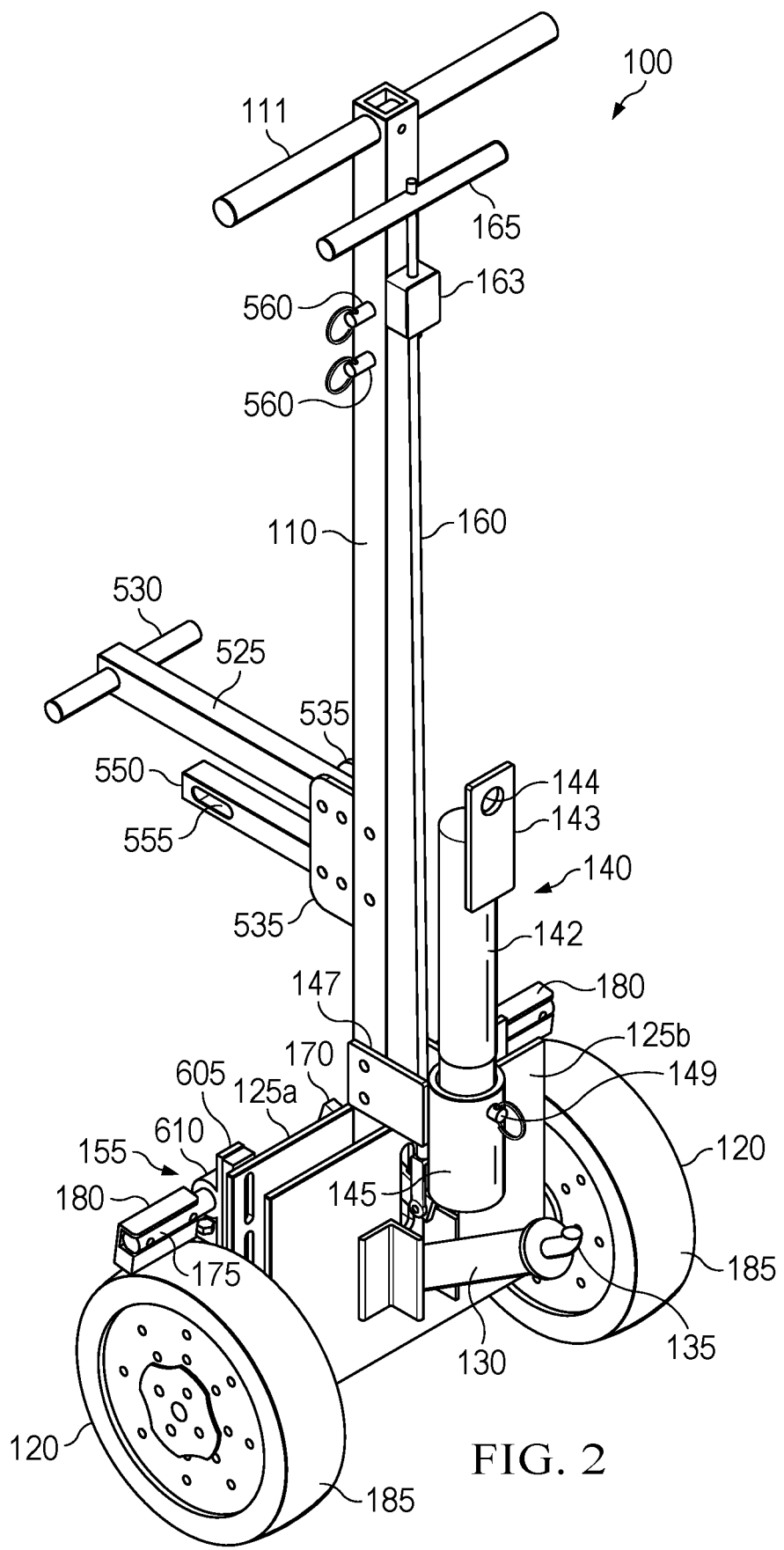
FIG. 2 is a rear perspective view of the barrier hauler of FIG. 1.
Figure 3:
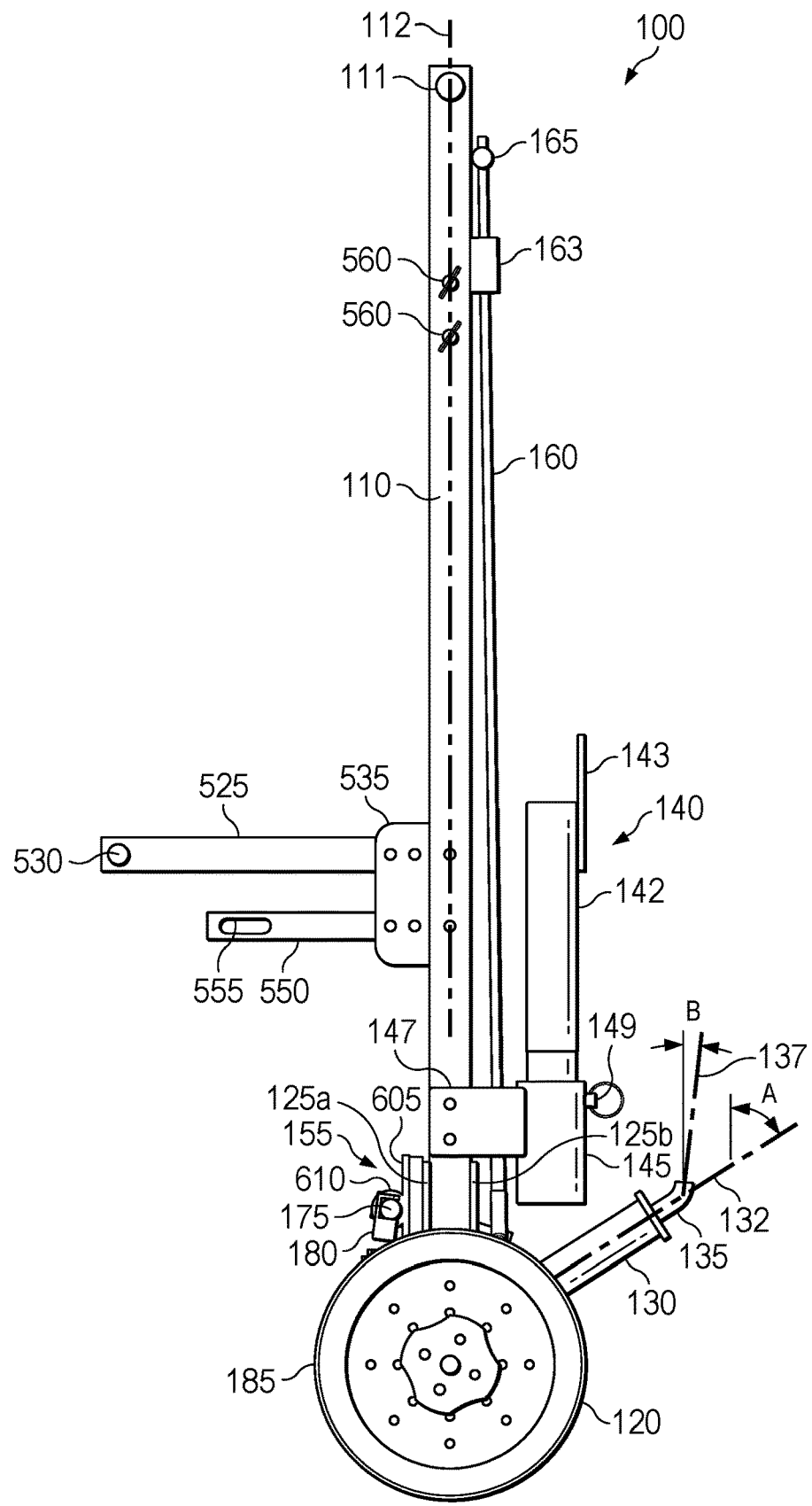
FIG. 3 is a right side view of the barrier hauler of FIG. 1.

The illustrated figures are only exemplary and are not intended to assert or imply any limitation with regard to the environment, architecture, design, or process in which different examples may be implemented.

DETAILED DESCRIPTION

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates generally to the field of vehicle mitigation systems, and specifically to portable barriers and barrier haulers capable of rapidly deploying the portable barriers to protect against vehicular and military style breaches. A vehicle mitigation system is described herein that includes a portable barrier and a barrier hauler that is used to deploy the barrier near a perimeter defense area or selected location. One or more of the portable barriers may be arranged in various configurations to block a pathway, roadway or other opening to prevent vehicular or other traffic from passing. In some embodiments, the barriers may be deployed in a way that provides a complete perimeter security. In some embodiments, the barriers may be individually positioned. In these instances, the design of the barrier is such that the barrier's weight may assist in slowing or stopping a vehicle that contacts the barrier. The barrier may further be designed to turn or flip in such a way that portions of the barrier engage the ground upon contact by a vehicle and other portions engage or even lift parts of the vehicle from the ground, thus contributing to the slowing or halting of the vehicle. While the barriers may be individually positioned, either solely or in groups, the barriers also may in some embodiments be connected to one another, either rigidly or by arrestor cables. Connection of adjacent barriers widens the zone of protection and also presents a heavier retardant to unauthorized vehicle traffic.

The portability of the vehicle mitigation system allows the system to be quickly deployed to areas requiring defense against vehicles and other traffic. The barrier hauler discussed herein may be provided with one or more barriers in order to allow quick and efficient deployment of the barriers. The barrier hauler, along with wheels on the barrier itself improves the leverage afforded a single user that is tasked with unloading and positioning a barrier at the selected location. The barrier hauler may include a brake system to assist in lifting and lowering each barrier during moving. A brace arm may also be included on the barrier hauler to assist in stabilizing the load as the barrier is lowered into position. By quickly deploying and, if necessary, moving the barriers, the barriers are configured to absorb the kinetic energy of a vehicle as the vehicle contacts the barriers, and the barriers move with the vehicle following contact.

FIGS. 1-7 illustrate several views of a barrier hauler 100 according to an illustrative embodiment. The barrier hauler 100 may be combined with one or more portable barriers to form a vehicle mitigation system that allows for the slowing or stopping of vehicles or other traffic in a selected location. The portability of the vehicle mitigation system allows for quick and efficient transport and deployment of barriers. The barrier hauler 100 aids in providing that portability, especially given the heavy weights of the barriers, which often exceed 500 lb.

Figure 4:
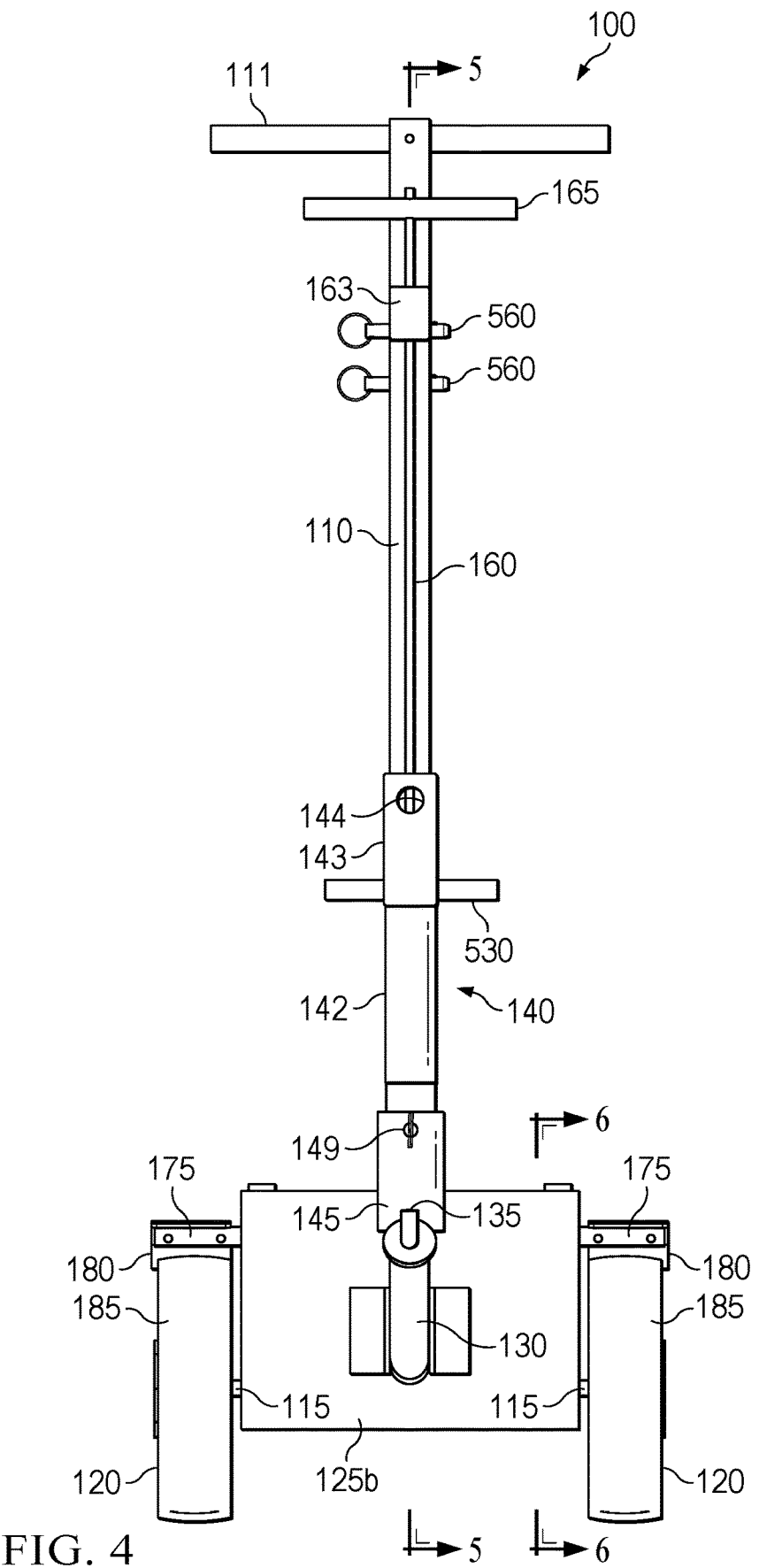
FIG. 4 is a rear view of the barrier hauler of FIG. 1.

Referring more specifically to FIGS. 1-4, the barrier hauler 100 is illustrated in a front perspective view (FIG. 1), a rear perspective view (FIG. 2), a right side view (FIG. 3), and a rear view (FIG. 4). The barrier hauler 100 includes an elongated stem 110 having a handle 111 positioned at a first end of the stem 110. The stem 110 may be designed in various shapes, but in the embodiment illustrated, the stem is elongated along a longitudinal axis 112, and may be formed from bar stock or tubing. The stem 110, along with other components of the barrier hauler 100 may be comprised of a high strength material such as steel, aluminum, or any other metals or alloys. Alternatively, non-metallic, high strength materials such as carbon fiber or polymers could instead by used. The barrier hauler 100 further includes an axle 115 (see FIG. 4) positioned between a pair of wheels 120 near a second end of the stem 110. The axle 115 may be a stationary axle about which wheels 120 rotate due to the placement of bearings or bushings between the wheels 120 and axle 115. Alternatively, the axle 115 could instead be a live axle that is rotatably coupled to another component of the barrier hauler and rigidly coupled to the wheels 120 such that rotation of the axle 115 itself also results in rotation of the wheels 120. If the axle 115 is non-rotating, the axle may be rigidly coupled to the stem 110 or alternatively to one or both plates 125a, 125b positioned on opposing sides of the stem 110. The plates 125a, 125b may be coupled to the stem using fasteners, welds, adhesives, or any other suitable fastening method.

The barrier hauler 100 also includes a lift arm 130 having an engagement pin 135. The lift arm 130 is rigidly fixed relative to the stem 110, and in the embodiment illustrated, the lift arm 130 may be welded or otherwise attached to the plate 125b or the stem 110. The lift arm 130 is generally elongated and extends generally from the stem 110 or the plate 125b attached to the stem 110. A longitudinal axis 132 of the lift arm 130 forms an angle, A, with the longitudinal axis 112 of the stem 110. The engagement pin 135 is attached to an end of the lift arm 130 furthest from the stem 110. The engagement pin 135 may in some embodiments be round in cross-section, although other cross-sectional shapes could be specified. The engagement pin 135 may either be curved or angled such that a longitudinal axis 137 associated with a distal end of the engagement pin 135 is angled relative to (i.e., not parallel to) the longitudinal axis 132 of the lift arm 130. The longitudinal axis 137 forms an angle B with the longitudinal axis 112 of the stem 110. In some embodiments, the angle B is less than the angle A, which results in the engagement pin 135 being angled in an upward direction from lift arm 130. This configuration allows the lift arm 130 to retain a higher angle relative to the stem 110, which provides more leverage for lifting a barrier. The presence of the engagement pin 135, however, and its more upright position allows for easier engagement of the barrier with the engagement pin 135. In some embodiments, the angle B may be zero, which means that the longitudinal axis 137 of the engagement pin 135 is parallel to the longitudinal axis 112 of the stem 110.

The barrier hauler 100 further includes an attachment bar 140 having a tubular portion 142 and a planar portion 143. The planar portion 143 includes an aperture 144 and is welded or otherwise attached to the tubular portion 142. The tubular portion 142 of the attachment bar 140 may be received by a sleeve 145 coupled to a component of the barrier hauler 100. The sleeve 145 may be coupled by brackets 147 to the stem 110. A pin 149 is removably inserted through apertures in the sleeve 145 and tubular portion 142 to secure the attachment bar 140 within the sleeve 145 in a stored position when the barrier hauler is not being used to move a barrier. The aperture 144 in the planar portion 143 is provided to receive the engagement pin 135 when the attachment bar 140 is attached to a barrier that is to be moved by the barrier hauler 100.

Figure 5:
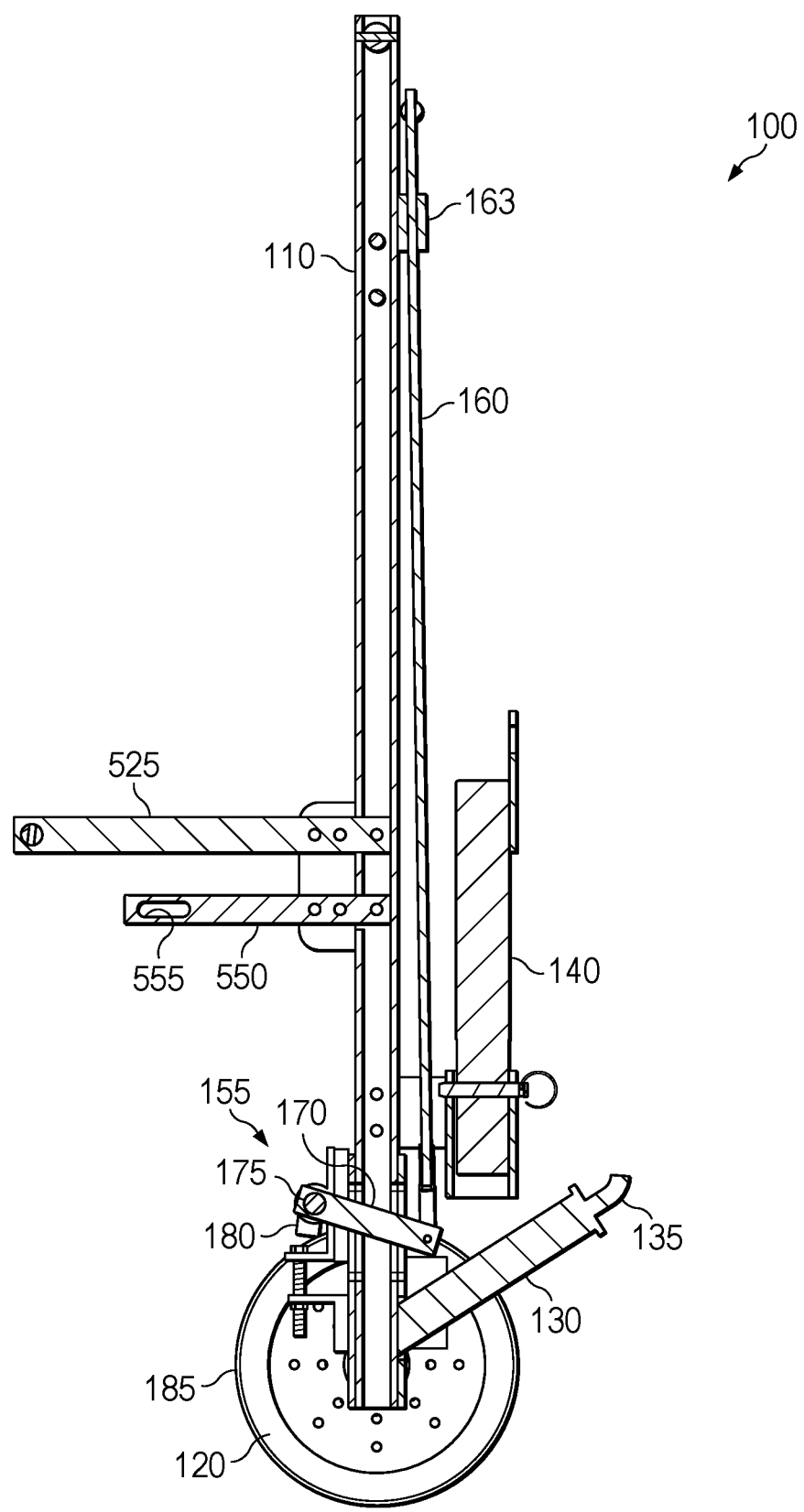
FIG. 5 is a cross-sectional side view of the barrier hauler of FIG. 4 taken at 5-5.
Figure 6:
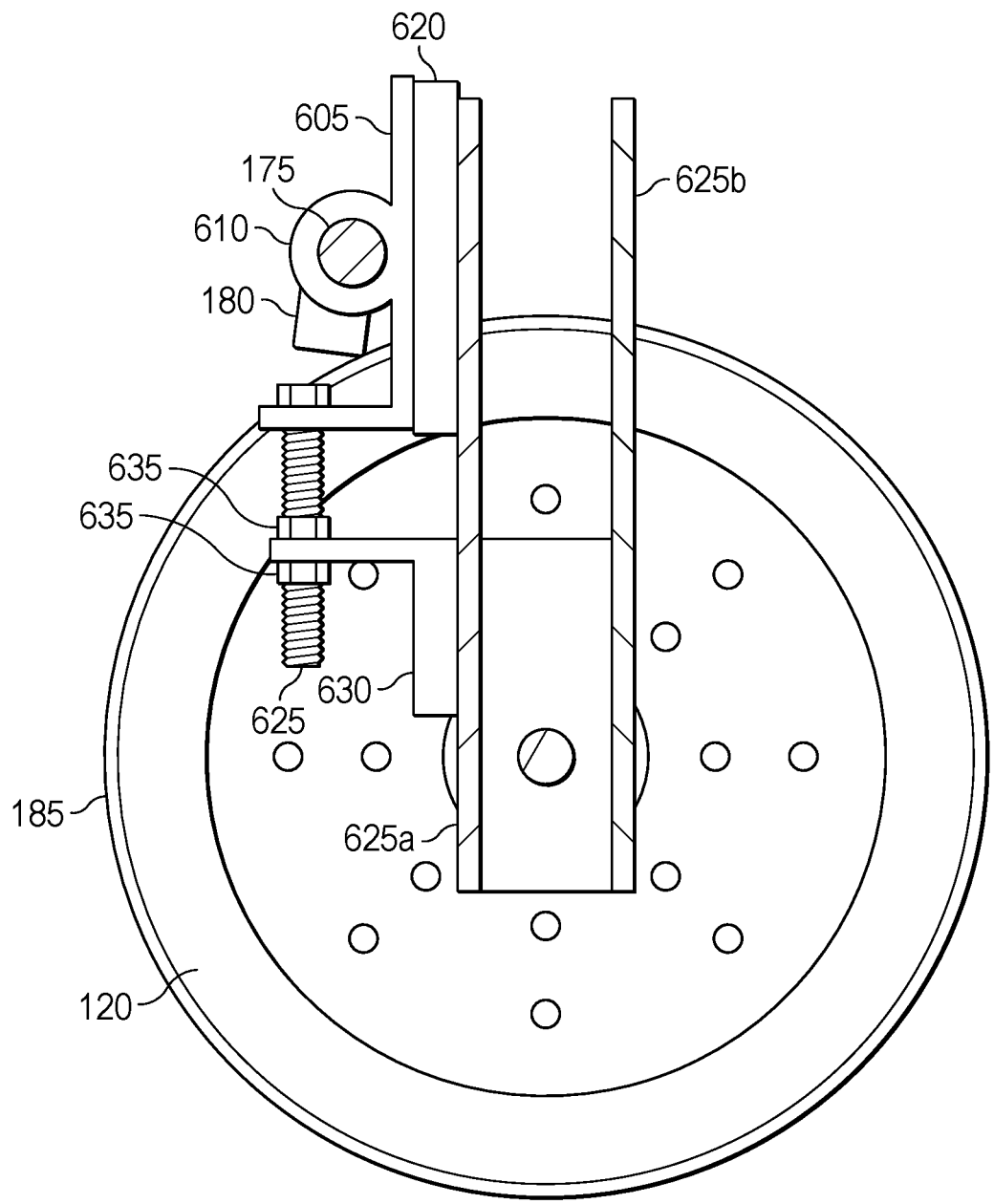
FIG. 6 is a cross-sectional side view of the barrier hauler of FIG. 4 taken at 6-6.
Figure 7:
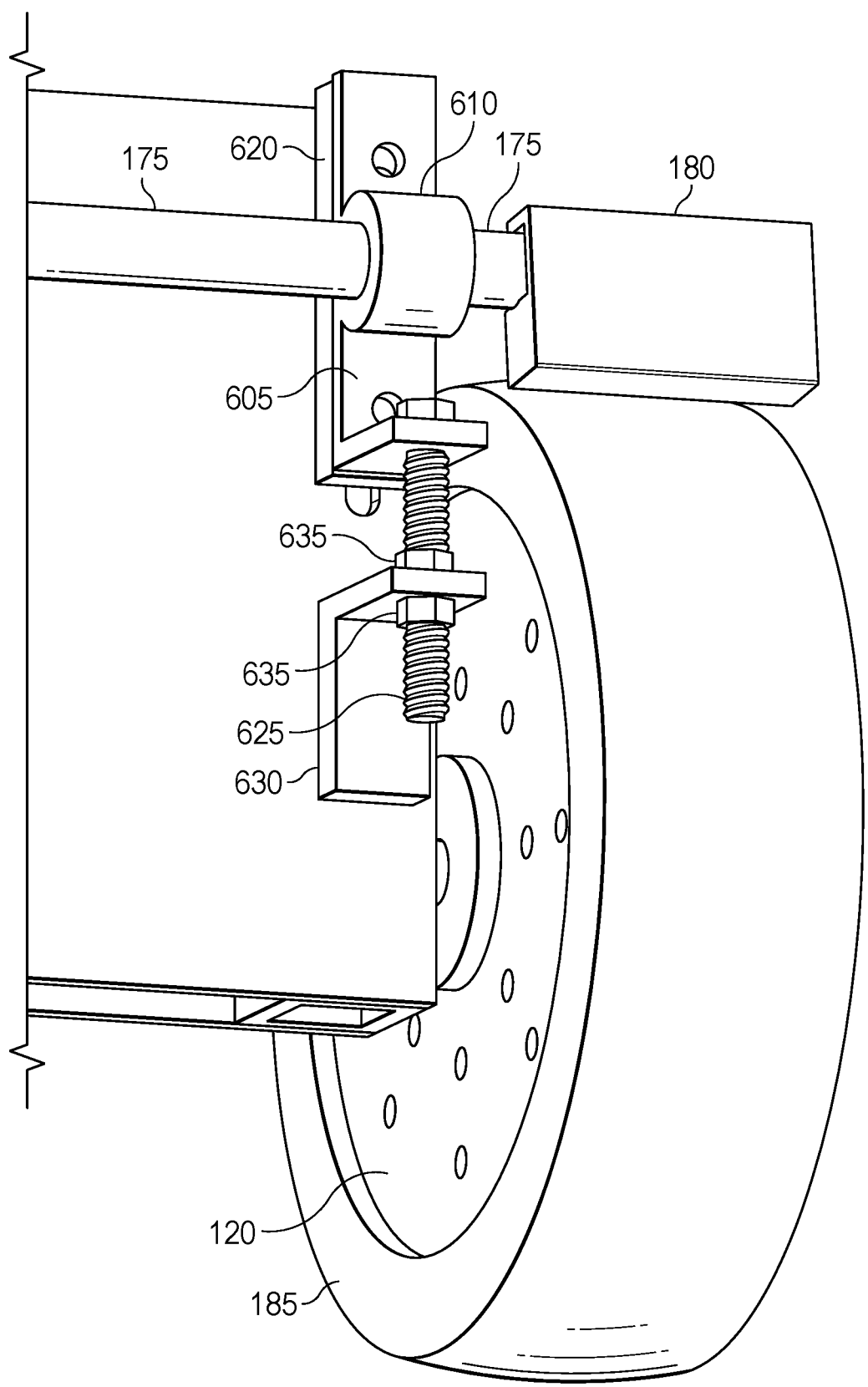
FIG. 7 is an enlarged perspective view of a wheel and brake pad of the barrier hauler of FIG. 1.

Referring to FIGS. 5-7, the barrier hauler 100 includes a brake system 155 that allows the wheels to be selectively locked to prevent rolling of the wheels while positioning a barrier with the barrier hauler 100. By engaging the braking system 155, it is easier to control the lowering (and lifting) of the barrier. The brake system 155 includes a brake rod 160 disposed substantially parallel (i.e., parallel or almost parallel) to the longitudinal axis 112 of the stem 110. The brake rod 160 is slidingly constrained by a guide 163 coupled to the stem 110 near a first end of the brake rod 160. The guide allows movement of the brake rod 160 in a direction generally parallel to the longitudinal axis 112 from an engaged position to a disengaged position. The brake rod is shown in the engaged position in FIGS. 1-5. A handle 165 is coupled to the brake rod 160 at the first end of the brake rod 160.

At a second end of the brake rod 160, the brake rod 160 is pivotally coupled to a pivot arm 170. The pivot arm 170 passes through slots in the plates 125a, 125b and is rigidly coupled to a brake shaft 175 such that movement of the brake rod 160 toward the engaged position (by pulling upward on the handle 165) rotates the brake shaft 175 in one direction and movement of the brake rod 160 toward the disengaged position (pushing downward on the handle 165) rotates the brake shaft 175 in an opposite direction. A brake pad 180 is coupled at each end of the brake shaft 175 to engage with or disengage from tread 185 on each wheel 120 depending on the rotation of the brake shaft 175. The brake pad 180 may be made from a metal, alloy, polymer or elastomer.

Since there is little dynamic braking, it is not expected that the brake pad 180 itself will wear excessively, even if softer materials are sometimes used. However, since the tread 185 on each wheel 120 may wear over time due to the number of barrier deployments, it is useful to be able to adjust the positioning of the brake pads 180 relative to the tread 185 when the tread 185 experiences wear. The brake system 155 therefore includes a bracket 605 that may be adjustably mounted relative to the wheel 120. The bracket 605 includes a sleeve 610 that receives the brake shaft 175. The sleeve 610 allows rotation of the brake shaft 175 within the sleeve 610. In some embodiments, a bushing or bearing may be disposed within the sleeve 610 to aid in the smooth rotation of the brake shaft 175. The bracket 605 is adjustably mounted to either the plate 125a, or alternatively a metallic or polymeric pad 620 may be positioned between the bracket 605 and the plate 125a. Movement and adjustment of the bracket 605 is controlled by rotating an adjustment fastener 625 (e.g., bolt) that passes through the bracket 605 and into a bracket 630 rigidly connected to the plate 625a. Securement nuts 635 are provided to lock the adjustment fastener 625 after positioning the brake shaft 175 and brake pad 180 in the desired position. Additional fasteners may be used after the adjustment to better secure the bracket 605 to the plate 625a or pad 620.

Referring again to FIG. 5, the barrier hauler further includes a brace arm 525 coupled to the stem 110 between the first end and the second end of the stem 110. The brace arm 525 extends from the stem 110 in a direction opposite that of the lift arm 130. A handle 530 is coupled to an end of the brace arm 525 opposite the stem. A gusset plate 535 may be attached to the stem 110 and brace arm 525 to provide further support for the connection between the stem 110 and the brace arm 525. The brace arm 525 is positioned to allow a user of the barrier hauler 100 to apply a force to the handle 530 of the brace arm 525 as a barrier is lowered into the desired location by the barrier hauler 100.

The barrier hauler may further include a storage arm 550 coupled to the stem 110 between the first end and second end of the stem 110, and preferably beneath the brace arm 525. The storage arm 550 includes a slot 555 through which a pin may be inserted to secure the barrier hauler 100 to a barrier in a stored position. In some embodiments, the storage arm 550 is received by a channel or sleeve on a barrier (described in more detail below), and the pin is then used to secure the barrier hauler to the barrier. Pins 560 (see FIGS. 1, 2, and 4) may be held by the stem 110 for use with storage arm 550 when the barrier hauler is stored.

As mentioned previously, vehicle mitigation systems are described herein that include one or more portable barriers and a barrier hauler that is used to deploy the barrier or barriers near a perimeter defense area or selected location. The type of barrier that may be moved by the barrier haulers described herein may vary in configuration and design.

Figure 8:
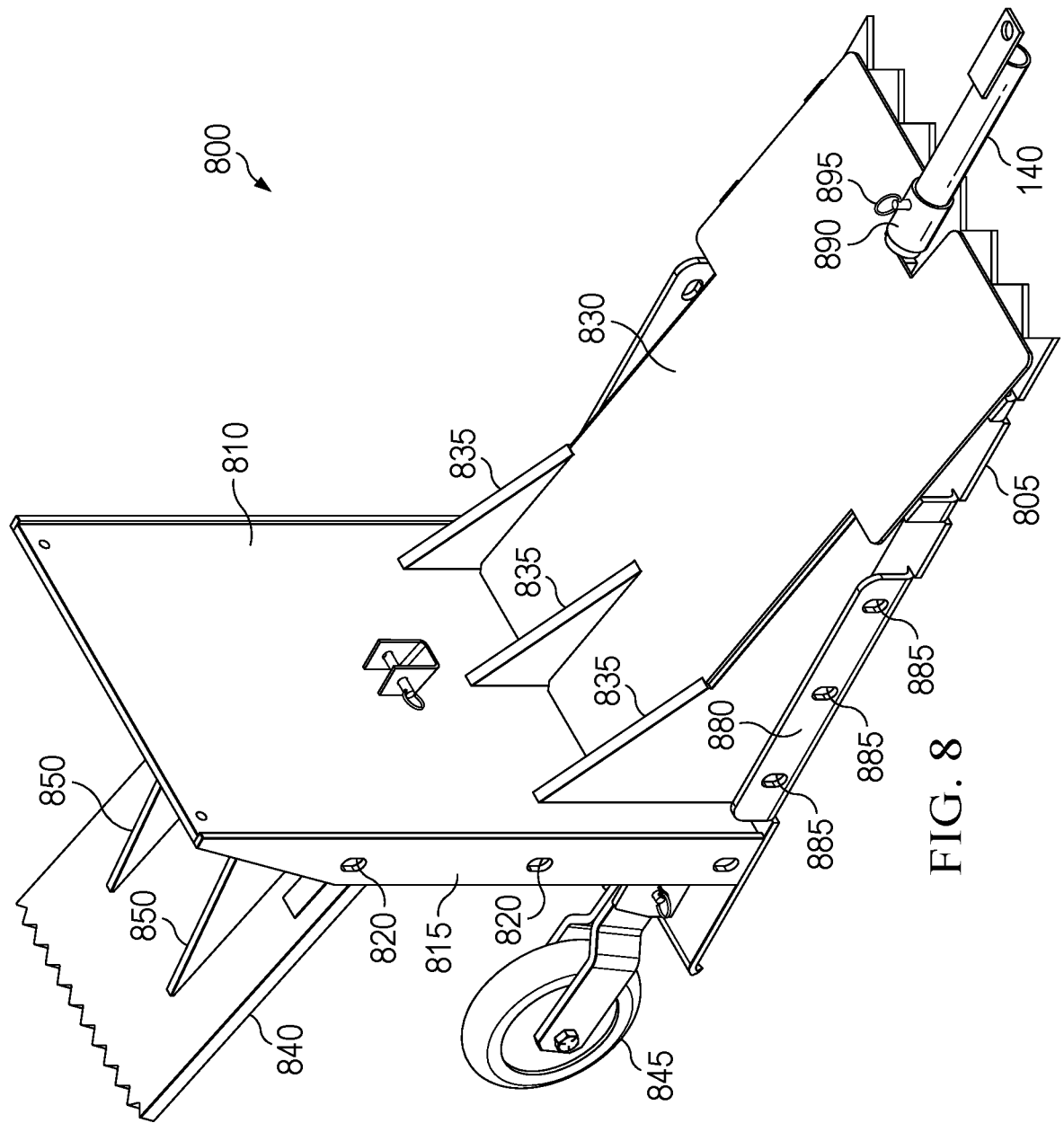
FIG. 8 is a front perspective view of a barrier in accordance with one or more examples described herein.

FIG. 8 illustrates a front perspective view of a barrier 800 that may be deployed as part of the vehicle mitigation systems described herein. Portable barrier 800 is a generally L-shaped modular barrier 800 that includes a base plate 805 for supporting the modular barrier on a surface and an upwardly extending front plate 810 for receiving impact forces and for providing munitions protection. The front plate 810 includes vertically-oriented side plates 815 having apertures 820. A ramp 830 is provided on a first side of the front plate 810 and supported by a plurality of gussets 835. Portable barrier 800 also includes a kick plate 840 positioned on a second side of the front plate 810. A wheel assembly 845 is positioned beneath the kick plate 840, and the wheels of the wheel assembly are extendable into a transport position to allow transport of the portable barrier 800. A plurality of gusset reinforcements 850 are provided on the second side of the front plate 810 to support the kick plate 840. A horizontally-oriented side plate 880 is provided along the base plate 805 along each edge of the base plate. Similar to the vertically-oriented side plates 815, the horizontally-oriented side plates 880 include apertures 885. The apertures 820 and 885 allow for attachment of barrier 800 to other adjacent barriers. Barrier 800 includes a sleeve 890 positioned at an end of the barrier 800 opposite the end where the wheel assembly 845 is mounted to the barrier 800. The sleeve 890 is configured to receive the attachment bar 140 of the barrier hauler 100. A pin 895 may be inserted through apertures on the sleeve 890 and attachment bar 140 to secure the attachment bar 140 within the sleeve 890.

Figure 9:
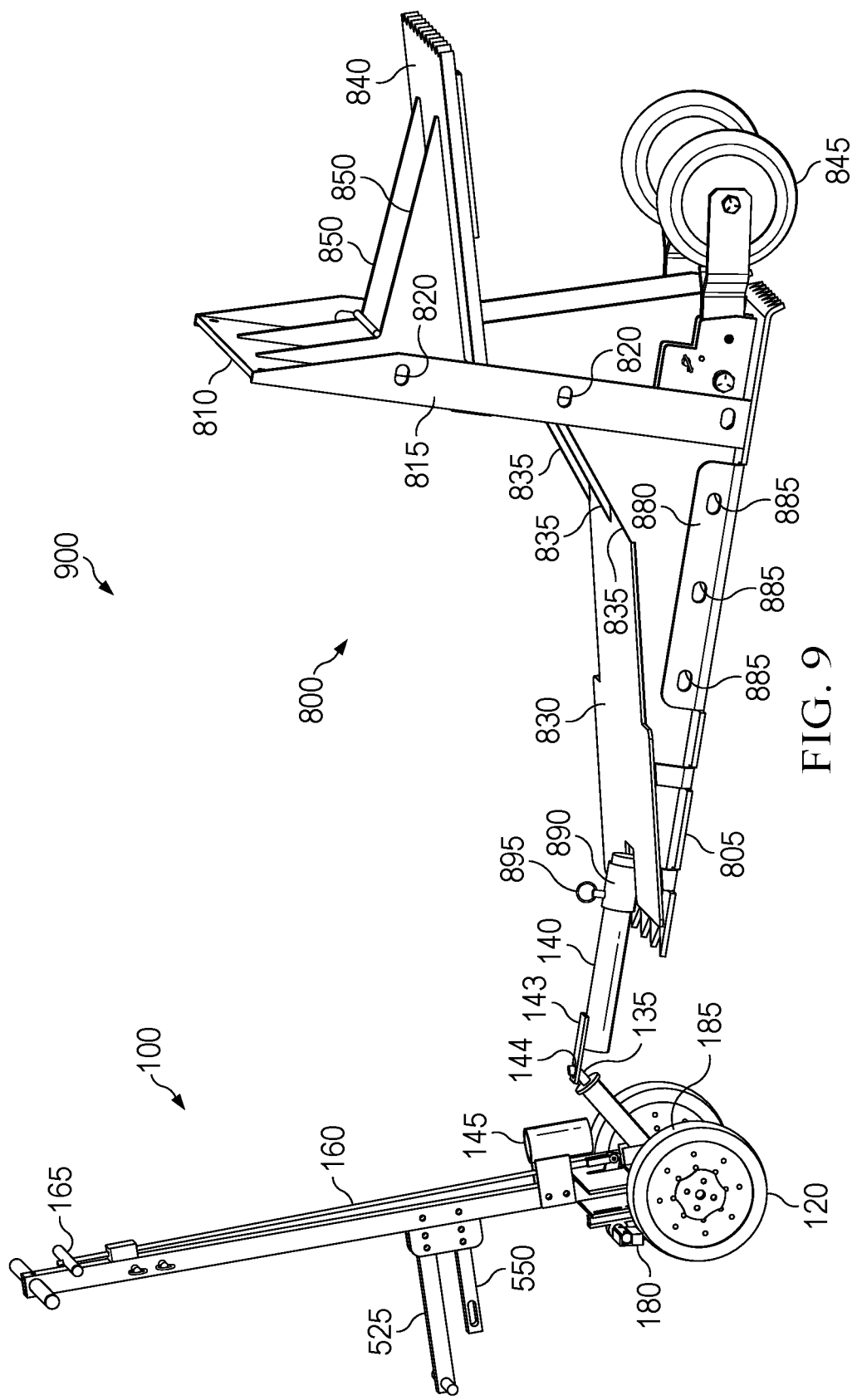
FIG. 9 is a rear perspective view of a vehicle mitigation system in accordance with one or more examples described herein, the vehicle mitigation system including a barrier hauler moving a barrier.

Referring now to FIG. 9, a perspective view is depicted of a vehicle mitigation system 900 having the barrier 800 illustrated in FIG. 8 and the barrier hauler 100 illustrated in FIGS. 1-7. In operation, to move barrier 800 from one location to another or to deploy the barrier 800 at a desired location, the attachment bar 140 is first removed from the sleeve 145 of the hauler 100 and inserted into the sleeve 890 of the barrier 800. After securing the attachment bar 140 with the pin 895, the user of the barrier hauler 100 manipulates the barrier hauler 100 from the side on which the brace arm 525 is located. The barrier hauler 100 is tilted forward such that the engagement pin 135 engages and is inserted into the aperture 144 in the planar portion 143 of the attachment bar 140. The user then applies to the handle 111 a quick downward force back toward the user so that the end of the barrier 800 nearest the barrier hauler 100 may be lifted from the ground. This motion distributes all of the weight of the barrier 800 between the wheel assembly 845 and the wheels of 120 of the barrier hauler 100. The barrier 800 may then be easily rolled and moved by the user until the barrier 800 approaches the desired location for deployment. When that location is reached, the user may pull upward on the handle 165 that is coupled to the brake rod 160. As the brake rod 160 moves into the engaged position, the brake pads 180 engage the tread 185 of the wheels 120, which prevents the wheels 120 from being able to roll. The user then begins to lower the barrier 800 back into contact with the ground. Since the barrier 800 is heavy, the user may grasp the handle 530 of the brace arm 525 to aid in lowering the elevated end of the barrier 800. After lowering the barrier 800, the user may release the handle 165 to allow the rod to move into the disengaged position, thereby releasing the brake pads 180. The user than tilts the barrier hauler 800 forward again to disengage the engagement pin 135 from the aperture 144. Finally, the attachment bar 140 may be removed from the sleeve 890 and returned to the sleeve 145 of the barrier hauler 100 for storage.

Figure 10:
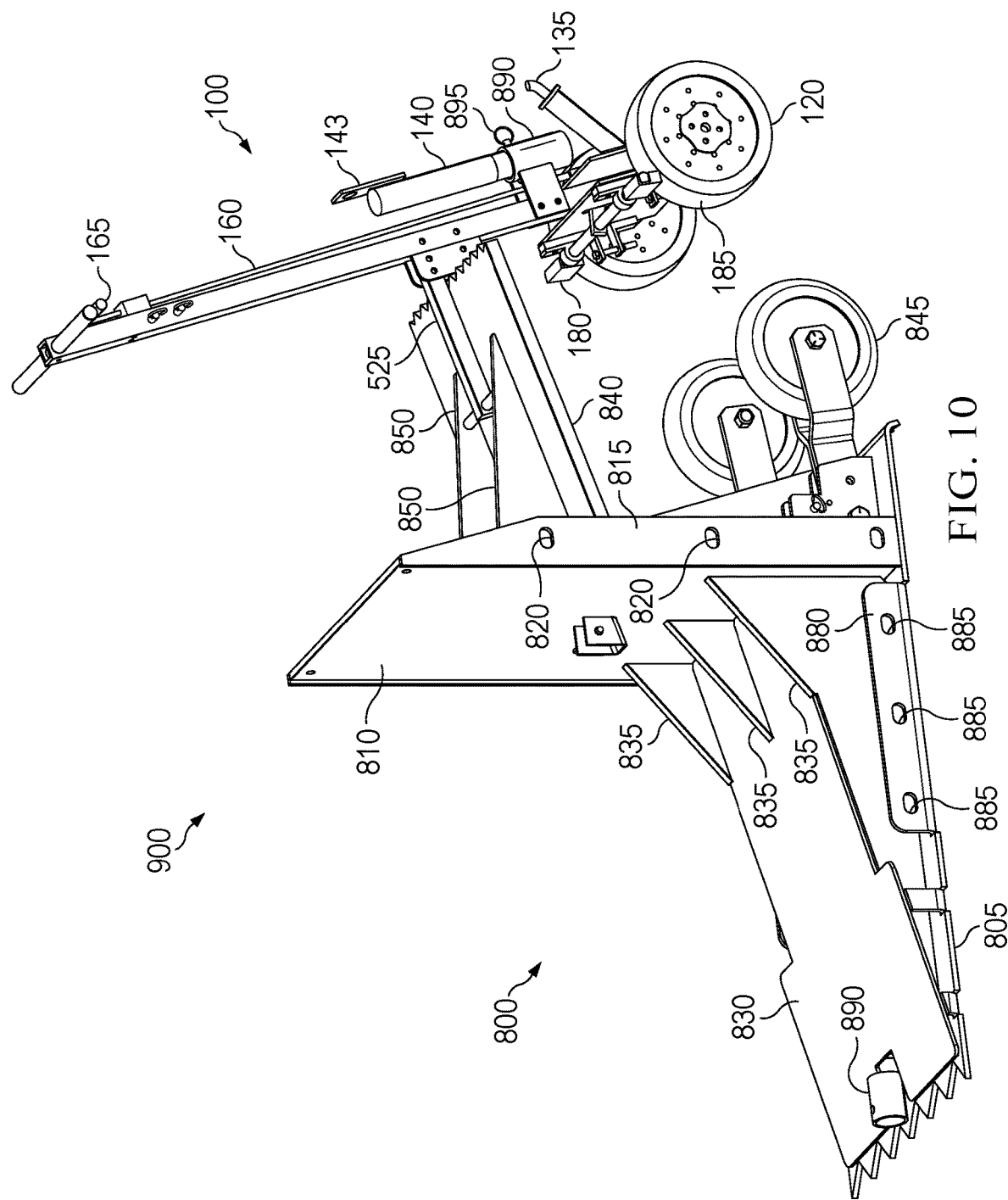
FIG. 10 is a front perspective view of the vehicle mitigation system of FIG. 9 with the barrier hauler positioned in a stored position.
Figure 11:
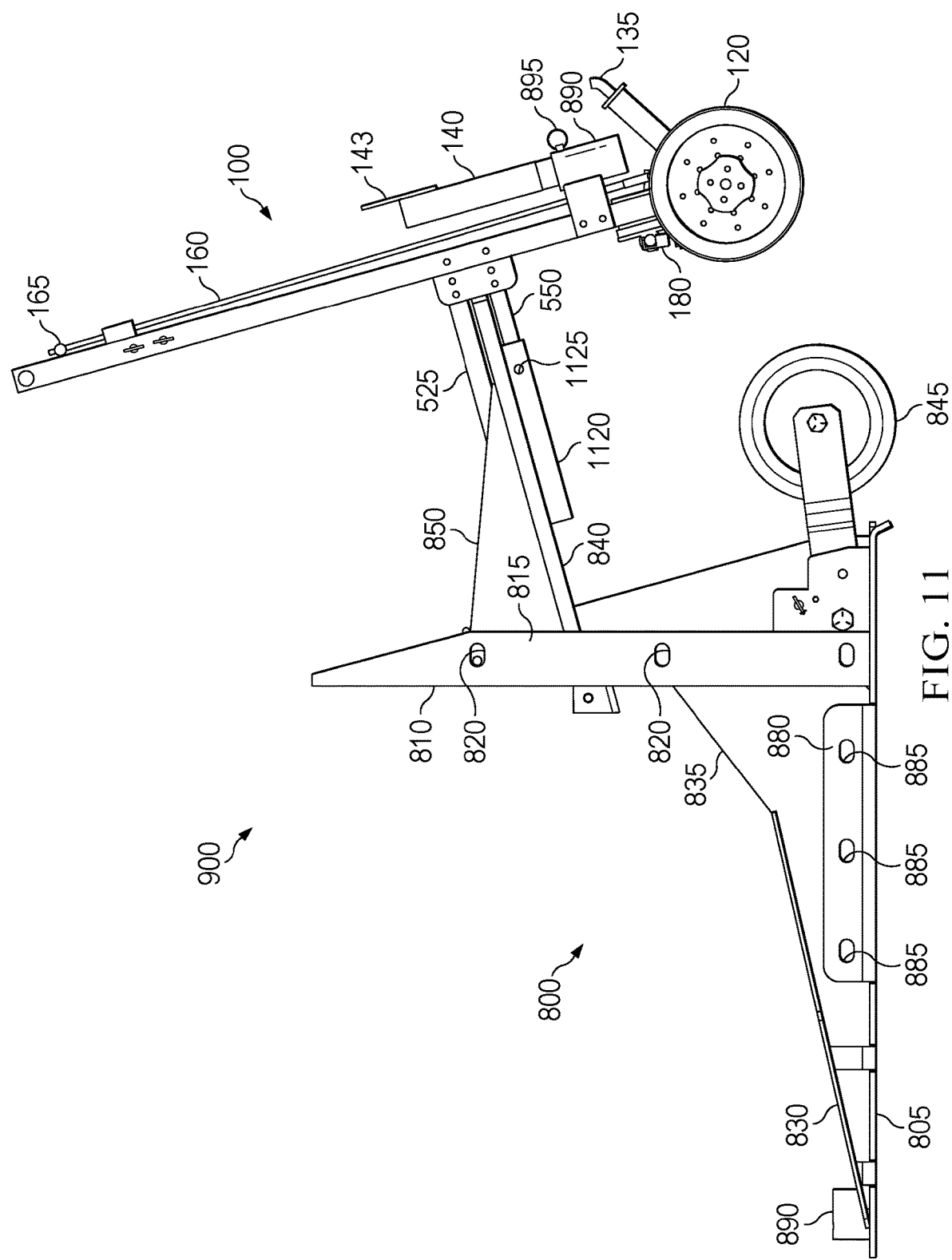
FIG. 11 is a right side view of the vehicle mitigation system of FIG. 9 with the barrier hauler positioned in the stored position.

Referring to FIGS. 10 and 11, the barrier hauler 100 may be stored with the barrier 800 when not being used to transport barriers. The storage arm 550 of the barrier hauler 100 may be received by a sleeve 1120 (see FIG. 11) disposed on a bottom surface of the kick plate 840 of barrier 800. After inserting the storage arm 550 into the sleeve 1120, the user may insert a pin through the aperture 1125 of sleeve 1120 and the slot 555 of storage arm 550 to secure the barrier hauler 100 in the stored position illustrated in FIGS. 10 and 11. The barrier hauler 100 may be stored on the barrier 800 in this position while the barrier is positioned in a deployed position or while the barrier is being transported from one location to another, such as on a trailer or other vehicle.

Figure 12:
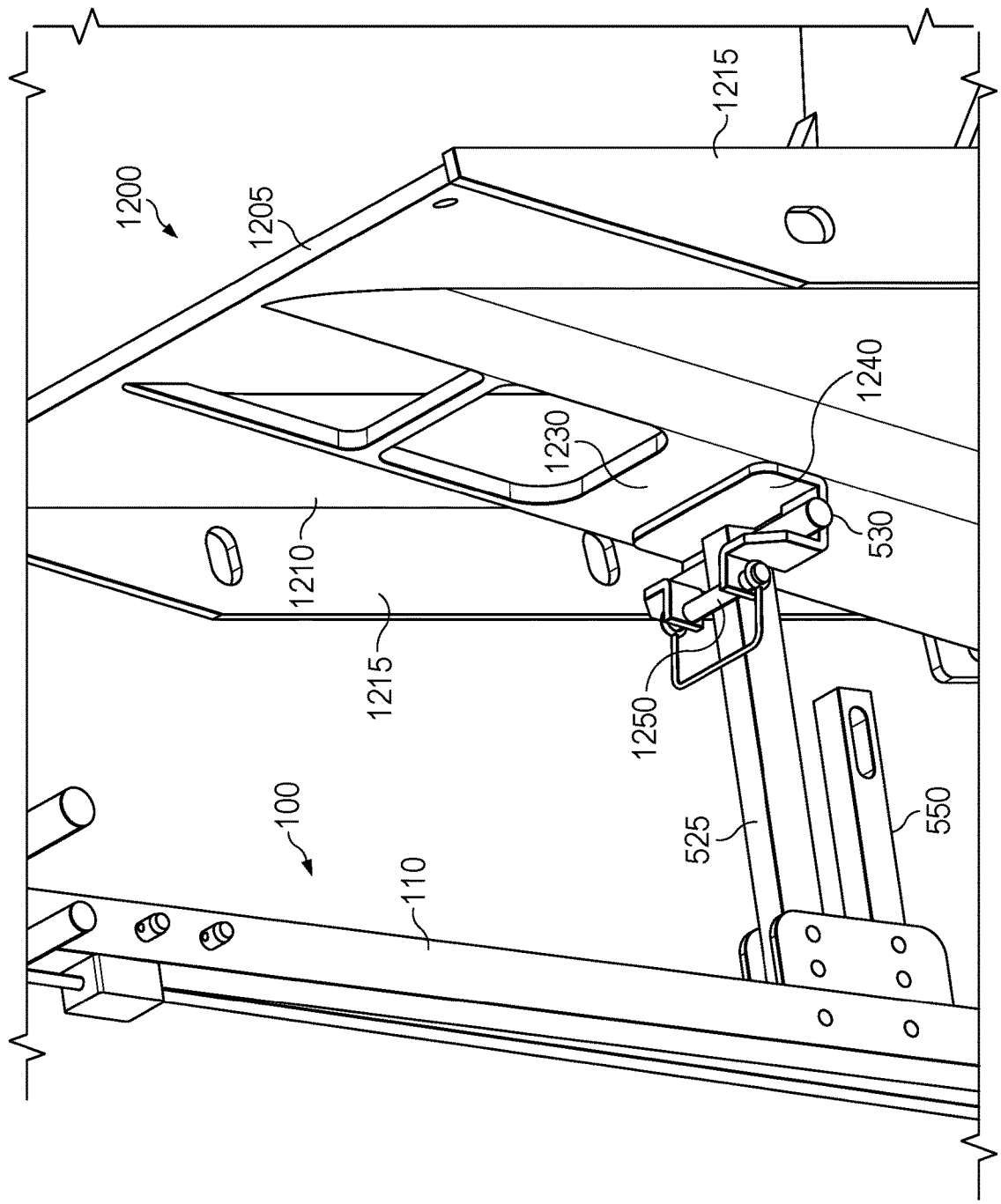
FIG. 12 is an enlarged perspective view of a vehicle mitigation system in accordance with one or more examples described herein, the vehicle mitigation system including a barrier hauler positioned in a stored position on a barrier.

FIG. 12 illustrates an enlarged rear perspective view of a vehicle mitigation system 1200 having a barrier 1205 that varies in design from barrier 800. Barrier 1205 has some similar components such as a front plate 1210, vertically-oriented side plates 1215, a base plate (not shown), and a horizontally-oriented side plate (not shown). Instead of having a kick plate like barrier 800, barrier 1205 includes a central brace 1230 that supports and connects the front plate 1210 to the base plate. A generally U-shaped hauler bracket 1240 is coupled to the central brace 1230. The barrier 1205 has a sleeve similar to sleeve 890 that allows the use of an attachment bar and movement of the barrier 1205 by the barrier hauler 100. To store the barrier hauler 100, the handle 530 of the brace arm 525 may be inserted in a channel formed by the hauler bracket 1240 and a pin 1250 inserted to secure the barrier hauler 100 to the barrier 1205.

In one exemplary application, the vehicle mitigation systems described herein may be deployed in a construction zone. In another exemplary application, the vehicle mitigation systems may be deployed in an overhead powerline construction site. In another exemplary application, the vehicle mitigation systems may be deployed at a manhole construction site. The vehicle mitigation systems may be used in typical traffic management applications for several scenarios including events, bridge construction, diversions, detours, road closures, lane closures, protective security, mass gatherings, building sites, mines, parks and sportsgrounds and road maintenance.

In addition to the embodiments and examples of a vehicle mitigation system provided above, the following are illustrative examples of vehicle mitigation systems, barrier haulers, and methods of deploying vehicle mitigation systems.

Example 1. A vehicle mitigation system comprises a barrier hauler and a barrier. The barrier hauler comprises a stem; a handle positioned at one end of the stem; at least one wheel positioned near an opposite end of the stem, the wheel capable of rotating relative to the stem; and a lift arm having an engagement pin, the lift arm rigidly fixed relative to the stem and disposed at a first angle to the stem. The barrier comprises at least one wheel positioned at a first end of the barrier to act in cooperation with the at least one wheel of the barrier hauler when the barrier hauler is engaged with the barrier.

Example 2. The system of example 1, wherein a sleeve is positioned at a second end of the barrier opposite the at least one wheel of the barrier and wherein an attachment bar is positioned within the sleeve, the attachment bar having an aperture to receive the engagement pin of the lift arm when the barrier hauler is engaged with the barrier.

Example 3. The system of example 1 or 2, wherein the engagement pin is curved or angled relative to a longitudinal axis of the lift arm.

Example 4. The system of any of examples 1-3, wherein the barrier hauler further comprises a storage sleeve capable of receiving the attachment bar in a stored position when the barrier hauler is not engaged to the barrier.

Example 5. The system of any of examples 1-4, wherein the barrier hauler further comprises a brake system comprising a brake rod disposed substantially parallel to a longitudinal axis of the stem, the brake rod slidingly constrained near a first end of the brake rod to allow movement of the rod from an engaged position to a disengaged position; a handle coupled to the brake rod at the first end of the brake rod; a pivot arm disposed at a second end of the brake rod and pivotally coupled to the brake rod, the pivot arm rigidly coupled to a brake shaft such that movement of the brake rod toward the engaged position rotates the brake shaft in one direction and movement of the brake rod toward the disengaged position rotates the brake shaft in another direction; and a brake pad coupled to the brake shaft to engage with or disengage from the wheel depending on the rotation of the brake shaft.

Example 6. The system of example 5, wherein the brake system further comprises a bracket having a sleeve to receive the brake shaft, the sleeve allowing rotation of the brake shaft within the sleeve, the bracket adjustably mounted to the barrier hauler such that the brake shaft and brake pad may be selectively adjusted and moved toward the wheel as tread on the wheel wears over time.

Example 7. The system of any of examples 1-6, the barrier hauler further comprising a brace arm coupled to the stem between the first end and second end, the brace arm extending from the stem in a direction opposite the lift arm; and a handle coupled to the brace arm.

Example 8. The system of any of examples 1-7 further comprising a storage arm coupled to the stem between the first end and second end, the storage arm having a slot through which a pin may be inserted to secure the barrier hauler to a barrier in a stored position.

Example 9. A barrier hauler comprising a stem; a handle positioned at one end of the stem; an axle disposed proximate an opposite end of the stem; at least one wheel rotatably coupled to the axle; and a lift arm having an engagement pin, the lift arm rigidly fixed relative to the stem and disposed at a first angle to the stem.

Example 10. The barrier hauler of example 9 further comprising an attachment bar having an aperture to receive the engagement pin of the lift arm when the attachment bar is secure to a barrier.

Example 11. The barrier hauler of example 9 or 10, wherein the engagement pin is curved or angled relative to a longitudinal axis of the lift arm.

Example 12. The barrier hauler of any of examples 9-11, wherein the barrier hauler further comprises a storage sleeve capable of receiving the attachment bar in a stored position when the barrier hauler is not engaged to a barrier.

Example 13. The barrier hauler of any of examples 9-12 further comprising a brake system comprising a brake rod disposed substantially parallel to a longitudinal axis of the stem, the brake slidingly constrained near a first end of the brake rod to allow movement of the rod from an engaged position to a disengaged position; a handle coupled to the brake rod at the first end of the brake rod; a pivot arm disposed at a second end of the brake rod and pivotally coupled to the brake rod, the pivot arm rigidly coupled to a brake shaft such that movement of the brake rod toward the engaged position rotates the brake shaft in one direction and movement of the brake rod toward the disengaged position rotates the brake shaft in another direction; and a brake pad coupled to the brake shaft to engage with or disengage from the wheel depending on the rotation of the brake shaft.

Example 14. The barrier hauler of example 13, wherein the brake system further comprises a bracket having a sleeve to receive the brake shaft, the sleeve allowing rotation of the brake shaft within the sleeve, the bracket adjustably mounted to the barrier hauler such that the brake shaft and brake pad may be selectively adjusted and moved toward the wheel as tread on the wheel wears over time.

Example 15. The barrier hauler of any of examples 9-14, the barrier hauler further comprising a brace arm coupled to the stem between the first end and second end, the brace arm extending from the stem in a direction opposite the lift arm; and a handle coupled to the brace arm.

Example 16. The barrier hauler of any of examples 9-15 further comprising a storage arm coupled to the stem between the first end and second end, the storage arm having a slot through which a pin may be inserted to secure the barrier hauler to a barrier in a stored position.

Example 17. A method of deploying a vehicle barrier comprising attaching an attachment bar to a barrier, the attachment bar having an aperture; positioning an engagement pin of a barrier hauler into the aperture of the attachment bar; rotating a stem of the barrier hauler away from the barrier to lift the barrier; and rolling the barrier hauler to move the barrier to a selected location.

Example 18. The method of example 17 further comprising engaging a brake system to prevent rolling of the barrier hauler.

Example 19. The method of example 17 or 18 further comprising lowering the barrier at the selected location.

Example 20. The method of example 19 wherein lowering the barrier at the selected location further comprises engaging a brace arm to assist in rotating the stem of the barrier hauler toward the barrier to lower the barrier.

Although the present disclosure and its advantages have been described in detail, it should be understood that various changes, substitutions and alterations can be made herein without departing from the spirit and scope of the disclosure as defined by the following claims.

What is claimed is:

1. A vehicle mitigation system comprising:
a barrier hauler comprising:
  a stem;
  a handle positioned at one end of the stem;
  at least one wheel positioned near an opposite end of the stem, the wheel capable of rotating relative to the stem; and
  a lift arm having an engagement pin, the lift arm rigidly fixed relative to the stem and disposed at a first angle to the stem; and
  a brake system comprising:
    a brake rod disposed substantially parallel to a longitudinal axis of the stem, the brake rod slidingly constrained near a first end of the brake rod to allow movement of the rod from an engaged position to a disengaged position;
    a handle coupled to the brake rod at the first end of the brake rod;
    a pivot arm disposed at a second end of the brake rod and pivotally coupled to the brake rod, the pivot arm rigidly coupled to a brake shaft such that movement of the brake rod toward the engaged position rotates the brake shaft in one direction and movement of the brake rod toward the disengaged position rotates the brake shaft in another direction;
    a brake pad coupled to the brake shaft to engage with or disengage from the wheel depending on the rotation of the brake shaft; and
    a bracket having a sleeve to receive the brake shaft, the sleeve allowing rotation of the brake shaft within the sleeve, the bracket adjustably mounted to the barrier hauler such that the brake shaft and the brake pad may be selectively adjusted and moved toward the wheel; and
a barrier comprising:
  at least one wheel positioned at a first end of the barrier to act in cooperation with the at least one wheel of the barrier hauler when the barrier hauler is engaged with the barrier.

2. The system of claim 1, wherein:
a sleeve is positioned at a second end of the barrier opposite the at least one wheel of the barrier; and
an attachment bar is positioned within the sleeve, the attachment bar having an aperture to receive the engagement pin of the lift arm when the barrier hauler is engaged with the barrier.

3. The system of claim 1, wherein the engagement pin is curved or angled relative to a longitudinal axis of the lift arm.

4. The system of claim 1, wherein the barrier hauler further comprises a storage sleeve capable of receiving the attachment bar in a stored position when the barrier hauler is not engaged to the barrier.

5. The system of claim 1, wherein the barrier hauler further comprising:
a brace arm coupled to the stem between the first end and second end, the brace arm extending from the stem in a direction opposite the lift arm; and
a handle coupled to the brace arm.

6. The system of claim 1, further comprising a storage arm coupled to the stem between the first end and second end, the storage arm having a slot through which a pin may be inserted to secure the barrier hauler to a barrier in a stored position.

7. A barrier hauler, comprising:
a stem;
a handle positioned at one end of the stem;
an axle disposed proximate an opposite end of the stem;
at least one wheel rotatably coupled to the axle;
a lift arm having an engagement pin, the lift arm rigidly fixed relative to the stem and disposed at a first angle to the stem;
a brake system comprising:
  a brake rod disposed substantially parallel to a longitudinal axis of the stem, the brake slidingly constrained near a first end of the brake rod to allow movement of the rod from an engaged position to a disengaged position;
  a handle coupled to the brake rod at the first end of the brake rod;
  a pivot arm disposed at a second end of the brake rod and pivotally coupled to the brake rod, the pivot arm rigidly coupled to a brake shaft such that movement of the brake rod toward the engaged position rotates the brake shaft in one direction and movement of the brake rod toward the disengaged position rotates the brake shaft in another direction;
  a brake pad coupled to the brake shaft to engage with or disengage from the wheel depending on the rotation of the brake shaft; and
  a bracket having a sleeve to receive the brake shaft, the sleeve allowing rotation of the brake shaft within the sleeve, the bracket adjustably mounted to the barrier hauler such that the brake shaft and the brake pad may be selectively adjusted and moved toward the wheel.

8. The barrier hauler of claim 7, further comprising an attachment bar having an aperture to receive the engagement pin of the lift arm when the attachment bar is engaged to a barrier.

9. The barrier hauler of claim 7, wherein the engagement pin is curved or angled relative to a longitudinal axis of the lift arm.

10. The barrier hauler of claim 7, wherein the barrier hauler further comprises a storage sleeve capable of receiving the attachment bar in a stored position when the barrier hauler is not engaged to a barrier.

11. The barrier hauler of claim 7, further comprising:
a brace arm coupled to the stem between the first end and second end, the brace arm extending from the stem in a direction opposite the lift arm; and
a handle coupled to the brace arm.

12. The barrier hauler of claim 7, further comprising a storage arm coupled to the stem between the first end and second end, the storage arm having a slot through which a pin may be inserted to secure the barrier hauler to a barrier in a stored position.

13. A method of deploying a vehicle barrier with the vehicle mitigation system of claim 1, comprising:
    attaching an attachment bar to the barrier, the attachment bar having an aperture;
    positioning the engagement pin of the barrier hauler into the aperture of the attachment bar;
    rotating the stem of the barrier hauler away from the barrier to lift the barrier; and
    rolling the barrier hauler to move the barrier to a selected location.

14. The method of claim 13, further comprising engaging the brake system to prevent rolling of the barrier hauler.

15. The method of claim 14, further comprising lowering the barrier at the selected location.

16. The method of claim 15, wherein lowering the barrier at the selected location further comprises engaging a brace arm to assist in rotating the stem of the barrier hauler toward the barrier to lower the barrier.

17. A barrier hauler, comprising:
    a stem;
    a handle positioned at one end of the stem;
    an axle disposed proximate an opposite end of the stem;
    two wheels rotatably coupled to the axle;
    a lift arm having an engagement pin, the lift arm rigidly fixed relative to the stem and disposed at a first angle to the stem;
    a brake system comprising:
        a brake rod disposed substantially parallel to a longitudinal axis of the stem, the brake slidingly constrained near a first end of the brake rod to allow movement of the rod from an engaged position to a disengaged position;
        a handle coupled to the brake rod at the first end of the brake rod;
        a pivot arm disposed at a second end of the brake rod and pivotally coupled to the brake rod, the pivot arm rigidly coupled to a brake shaft such that movement of the brake rod toward the engaged position rotates the brake shaft in one direction and movement of the brake rod toward the disengaged position rotates the brake shaft in another direction;
        two brake pads coupled to the brake shaft, wherein each of the two brake pads is configured to engage with or disengage from a respective wheel of the two wheels depending on the rotation of the brake shaft; and
        a bracket having a sleeve to receive the brake shaft, the sleeve allowing rotation of the brake shaft within the sleeve.

18. The barrier hauler of claim 17, further comprising an attachment bar having an aperture to receive the engagement pin of the lift arm when the attachment bar is engaged to a barrier.

19. The barrier hauler of claim 18, further comprising a storage sleeve capable of receiving the attachment bar in a stored position when the barrier hauler is not engaged to a barrier.

20. The barrier hauler of claim 17, wherein the bracket is adjustably mounted to the barrier hauler such that the brake shaft and the two brake pads may be selectively adjusted and moved toward the two wheels.

* * * * *